US010936364B2

(12) United States Patent
Zhou et al.

(10) Patent No.: US 10,936,364 B2
(45) Date of Patent: Mar. 2, 2021

(54) TASK ALLOCATION METHOD AND SYSTEM

(71) Applicant: ALIBABA GROUP HOLDING LIMITED, Grand Cayman (KY)

(72) Inventors: Xiang Zhou, Hangzhou (CN); Jiannan Ji, Hangzhou (CN); Chaoqun Zhan, Hangzhou (CN); Yue Pan, Hangzhou (CN); Yujun Liao, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 127 days.

(21) Appl. No.: 15/922,805

(22) Filed: Mar. 15, 2018

(65) Prior Publication Data

US 2018/0276031 A1 Sep. 27, 2018

Related U.S. Application Data

(63) Continuation of application No. PCT/CN2016/098187, filed on Sep. 6, 2016.

(30) Foreign Application Priority Data

Sep. 15, 2015 (CN) .......................... 201510587698.6

(51) Int. Cl.
*G06F 9/48* (2006.01)
*H04L 29/08* (2006.01)
(Continued)

(52) U.S. Cl.
CPC .............. *G06F 9/4887* (2013.01); *G06F 9/48* (2013.01); *G06F 9/4881* (2013.01);
(Continued)

(58) Field of Classification Search
None
See application file for complete search history.

(56) References Cited

U.S. PATENT DOCUMENTS 6,026,391 A * 2/2000 Osborn ................. G06F 16/217
2012/0324111 A1 12/2012 Brazel et al.

FOREIGN PATENT DOCUMENTS

CN 101739451 A 6/2010
CN 102902344 A 1/2013
(Continued)

OTHER PUBLICATIONS

Zhao et al., "SLA-Based Resource Scheduling for Big Data Analytics as a Service in Cloud Computing Environments", Sep. 1-4, 2015, IEEE, 2015 44th International Conference on Parallel Processing, pp. 510-519. (Year: 2015).*

(Continued)

*Primary Examiner* — Qing Yuan Wu
(74) *Attorney, Agent, or Firm* — Finnegan, Henderson, Farabow, Garrett & Dunner, LLP (57) ABSTRACT

Embodiments of the present application provide a task allocation method and system. The method includes: analyzing at least one query pattern of a target task to acquire expected response time of the query pattern; estimating system cost information and estimated response time according to the query pattern and service description information; estimating node cost information of each processing node of a set of processing nodes in a computing system; selecting a processing node of the set of processing nodes according to the node cost information to allocate subtasks of the target task to the selected processing node; and determining an unallocated subtask in the target task to schedule the unallocated subtask according to the expected response time, the system cost information, and the estimated response time.

19 Claims, 6 Drawing Sheets

(51) Int. Cl.
*G06F 9/50* (2006.01)
*H04L 29/06* (2006.01)
*H04L 12/24* (2006.01)
*G06F 16/24* (2019.01)
*G06F 16/33* (2019.01)

(52) U.S. Cl.
CPC .......... *G06F 9/5005* (2013.01); *G06F 9/5027* (2013.01); *H04L 29/06523* (2013.01); *H04L 29/08954* (2013.01); *H04L 41/5003* (2013.01); *H04L 41/5019* (2013.01); *G06F 16/24* (2019.01); *G06F 16/33* (2019.01); *G06F 2209/5012* (2013.01)

(56) References Cited

FOREIGN PATENT DOCUMENTS

| | | | |
|---|---|---|---|
| CN | 103177120 A | 6/2013 | |
| CN | 103235835 A | 8/2013 | |
| CN | 103841208 A | 6/2014 | |
| CN | 104424287 A | 3/2015 | |
| CN | 104852819 A | 8/2015 | |
| WO | WO 2017/045553 A1 | 3/2017 | |

OTHER PUBLICATIONS

Machine translation of CN102902344 (Year: 2013).*
First Search Report issued in corresponding Chinese Application No. 201510587698.6 (1 pg.).
First Office Action issued by The State Intellectual Property Office of People's Republic of China in corresponding foreign Application No. 201510587698.6; dated Feb. 3, 2019 (14 pgs.).
PCT International Preliminary Report on Patentability, International Written Opinion and International Search Report in corresponding PCT Application No. PCT/CN2016/098187; dated Dec. 12, 2016 (19 pgs.).

* cited by examiner

ABSTRACT# TASK ALLOCATION METHOD AND SYSTEM

CROSS REFERENCE TO RELATED APPLICATION

The disclosure claims the benefits of priority to International Application No. PCT/CN2016/098187, filed Sep. 6, 2016, which is based on and claims the benefits of priority to Chinese Application No. 201510587698.6, filed Sep. 15, 2015, both of which are incorporated herein by reference in their entireties.

BACKGROUND

A real-time computing system generally refers to a system having real-time or near-real-time computing response time (RT) in a distributed environment.

From the perspective of an external application system, a real-time computing system can have a high requirement on computing response time. The computing response time is expected to be as short as possible. From the perspective of the computing system, a platform can serve more than one external application. When the platform serves multiple external application services simultaneously, a faster response can require a greater computing load on a cluster system in unit time.

Even in a single service sub-cluster that has been physically isolated, a faster response can also bring a greater computing pressure to the cluster system in a peak access period. In this case, as a fast response may bring problems such as a memory-resource bottleneck, resource garbage collection cost, network-bandwidth filling, and system resource preemption, thereby causing the system response time to become longer or the system to get stuck or time out. Moreover, the real-time computing system has a time constraint condition. Therefore, if response time of a task becomes too long and goes beyond the time constraint, a problem, such as a task processing failure or a system error, may be caused.

SUMMARY

The technical problem to be solved by embodiments of the present application is to provide a task allocation method to stabilize a response latency.

Correspondingly, embodiments of the present application further provide a task allocation system to ensure implementation and application of the foregoing method.

To solve the foregoing problem, embodiments of the present application disclose a task allocation method of a computing system. The task allocation method can include: analyzing at least one query pattern of a target task to acquire an expected response time of the query pattern; estimating system cost information and estimated response time according to the query pattern and service description information; estimating node cost information of processing of each processing node of a set of processing nodes in the computing system; selecting a processing node of the set of processing nodes according to the node cost information to allocate subtasks of the target task to the selected processing node; and determining an unallocated subtask unallocated of the target task to schedule the unallocated subtask according to the expected response time, the system cost information, and the estimated response time.

In some embodiments, estimating the system cost information and the estimated response time according to the query pattern and service description information further includes: reading service description information of each query pattern, wherein the service description information is associated with service data of the computing system; estimating, according to the service description information, an amount of data scanned corresponding to each query pattern; and estimating the system cost information and the estimated response time according to the amount of data, wherein the system cost information includes at least one of the following: processor cost information, input/output cost information, and network cost information.

In some embodiments, before estimating the node cost information of processing of each processing node of the set of processing nodes in the computing system, the method further includes: pre-distributing a subtask in the target task to a respective processing node in the system.

In some embodiments, estimating the node cost information of processing of each processing node of the set of processing nodes in the computing system includes: determining service description information for each processing node of the set of processing nodes according to a database table corresponding to a query pattern of the subtask; and estimating, according to the service description information, the node cost information of the processing node for processing the subtask.

In some embodiments, selecting the processing node according to the node cost information to allocate the subtasks of the target task to the selected processing node includes: determining whether the node cost information of each processing node of the set of processing nodes is lower than a node threshold respectively; and allocating the pre-distributed subtask to the selected processing node when the node cost information of the selected processing node is lower than the node threshold.

In some embodiments, scheduling the unallocated subtasks according to the expected response time, the system cost information, and the estimated response time includes: conducting statistics on total processing time of allocated subtasks; estimating delay time of the unallocated subtask according to the expected response time, the system cost information, the estimated response time, and the total processing time; and allocating the unallocated subtask to a processing node after the unallocated subtask is delayed by the delay time.

In some embodiments, estimating the delay time of the unallocated subtask according to the expected response time, the system cost information, the estimated response time, and the total processing time further includes: estimating processing time of the unallocated subtask according to the estimated response time and the system cost information; and estimating the delay time of the unallocated subtask according to the expected response time and the processing time of the remaining subtask.

In some embodiments, allocating the unallocated subtask to the processing node after the unallocated subtask is delayed by the delay time further includes: counting the delay time after processing on the allocated subtasks is completed; and allocating the unallocated subtask to the processing node when the delay time elapses.

In some embodiments, the method further includes: in response to an allocated subtask being uncompleted after the total processing time elapses, reclaiming the allocated subtask; and scheduling the reclaimed subtask as an unallocated subtask.

Embodiments of the present application further disclose a task allocation system. The task allocation system can include: a query pattern analysis module configured to analyze at least one query pattern of a target task to acquire expected response time of the query pattern; a consumption and response time analysis module configured to estimate system cost information and estimated response time according to the query pattern and service description information, and estimate node cost information of each processing node of a set of processing nodes in a computing system; and a query task scheduling module configured to select a processing node of the set of processing nodes according to the node cost information to allocate subtasks in the target task to the selected processing node; and determine an unallocated subtask in the target task to schedule the unallocated subtask according to the expected response time, the system cost information, and the estimated response time.

In some embodiments, the consumption and response time analysis module can include: a reading submodule configured to read service description information of each query pattern, wherein the service description information is associated with service data of the system; a data amount estimation submodule configured to estimate, according to the service description information, an amount of data scanned corresponding to each query pattern; and a cost and response estimation submodule configured to estimate the system cost information and the estimated response time according to the amount of data, wherein the system cost information comprises at least one of processor cost information, input/output cost information, and network cost information.

In some embodiments, the query task scheduling module is further configured to pre-distribute a subtask in the target task to a respective processing node in the system.

In some embodiments, the consumption and response time analysis module is configured to determine service description information for each processing node according to a database table corresponding to a query pattern of the subtask; and estimate, according to the service description information, the node cost information of the processing node for processing the subtask.

In some embodiments, the query task scheduling module can include: a first allocation submodule configured to determine whether the node cost information of each processing node of the set of processing nodes is lower than a node threshold respectively; and allocate the pre-distributed subtask to the selected processing node when the node cost information of the selected processing node is lower than the node threshold.

In some embodiments, the query task scheduling module can include: a delay computing submodule configured to conduct statistics on total processing time of allocated subtasks; and estimate delay time of the unallocated subtask according to the expected response time, the system cost information, the estimated response time, and the total processing time; and a second allocation submodule configured to allocate the unallocated subtask to a processing node after the unallocated subtask is delayed by the delay time.

In some embodiments, delay computing submodule is further configured to estimate processing time of the unallocated subtask according to the estimated response time and the system cost information; and estimate the delay time of the unallocated subtask according to the expected response time and the processing time of the remaining subtask.

In some embodiments, the second allocation submodule is further configured to count the delay time after processing on the allocated subtasks is completed; and allocate the unallocated subtask to the processing node for processing when the delay time elapses.

In some embodiments, the task allocation system can further include: a long-tail processing module configured to, in response to an allocated subtask being uncompleted after the total processing time elapses, reclaim the allocated subtask, wherein the query task scheduling module is further configured to schedule the reclaimed subtask as an unallocated subtask.

Embodiments of the present application include advantages as below.

In embodiments of the present application, when a real-time computing system is employed to process a target task, a query pattern and expected response time corresponding thereto can be determined. By using the expected response time as a reference, system cost information and estimated response time are estimated according to the query pattern and service description information, and node cost information of processing of each processing node in the system is estimated. A subtask in the target task is allocated to a selected processing node. A remaining subtask unallocated in the target task is determined, and the remaining subtask is scheduled according to the expected response time, the system cost information, and the estimated response time. In this way, subtasks in the target task are processed in batches within the expected response time, thereby reducing the system cost on the basis of satisfying the expected response time. The system response can be prevented from being prolonged or suspended due to cost and other problems, and the response latency can be stabilized.

DETAILED DESCRIPTION

To make the foregoing objectives, features, and advantages of the present application clearer and more comprehensible, the present application is described in further detail in the following with reference to the accompanying drawings and specific implementation manners.

A response latency can be referred to as response latency time. A real-time computing system has a time constraint condition. Therefore, if a response time of a task becomes too long and goes beyond the time constraint of the real-time computing system, a problem, such as a task processing failure or a system error, may be caused. Therefore, embodiments of the present application provide a task allocation method and system to better stabilize the response latency.

When the real-time computing system is employed to process a target task, a query pattern and expected response time corresponding thereto can be determined. By using the expected response time as a reference, system cost information and estimated response time can be estimated according to the query pattern and service description information. And node cost information of each processing node in the system can also be estimated. A subtask in the target task can be allocated to a selected processing node. An unallocated subtask of the target task can be determined, and the unallocated subtask can be scheduled according to the expected response time, the system cost information, and the estimated response time. Therefore, subtasks in the target task can be processed in batches within the expected response time, to reduce the system cost on the basis of satisfying the expected response time. Thus, the system response can be prevented from being prolonged or suspended due to cost and other problems, and the response time can be stabilized.

Figure 1:
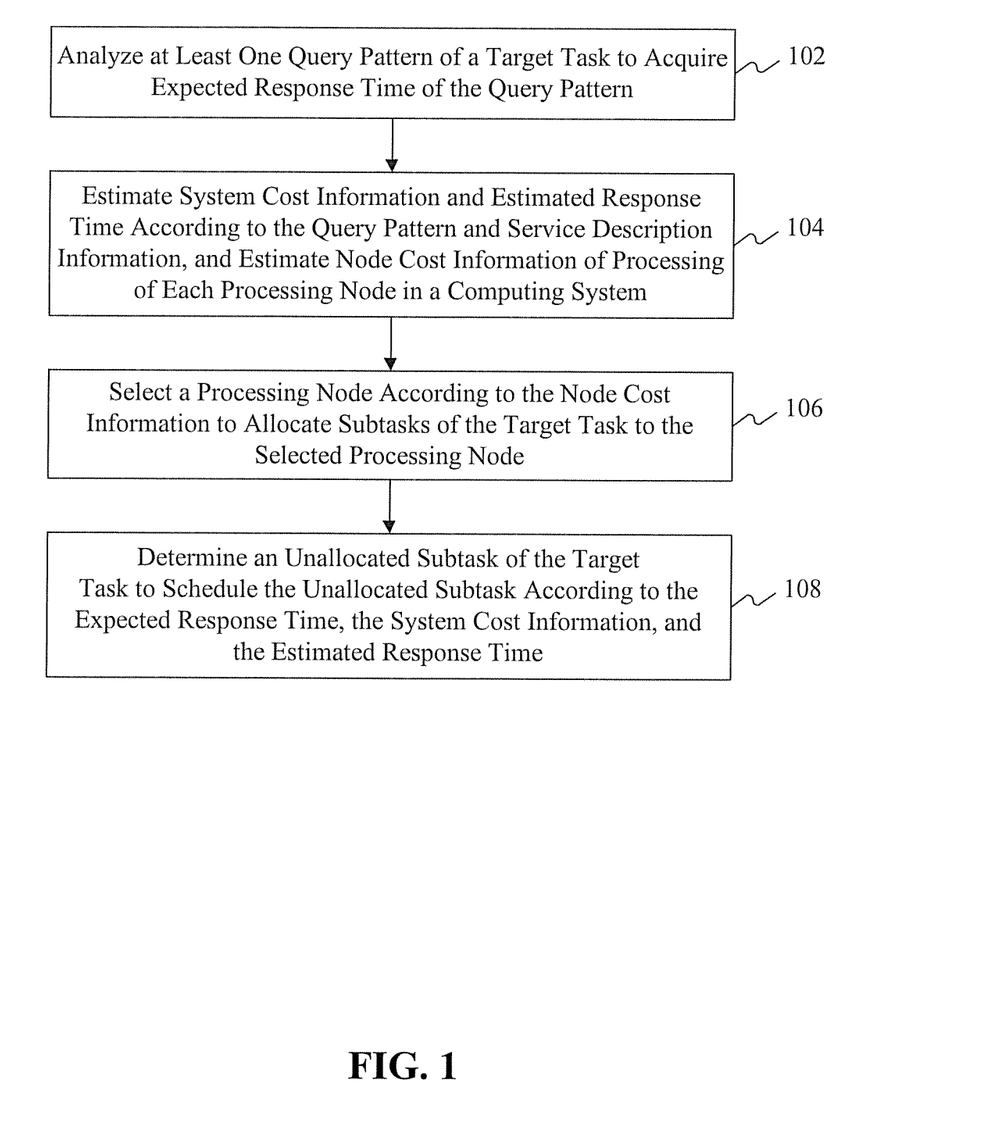
FIG. 1 is a flowchart of an exemplary task allocation method according to embodiments of the present application.

FIG. 1 is a flowchart of a task allocation method, according to embodiments of the present application. As shown in FIG. 1, the task allocation method can be performed by, for example, a real-time computing system, and include steps 102-108.

In step 102, at least one query pattern can be analyzed according to a target task to acquire expected response time of the query pattern. When a target task of the real-time computing system is processed to meet the requirement on real-time performance and increase the speed of processing the target task, each target task may include multiple subtasks. The system can process the multiple subtasks simultaneously by using multiple processing nodes.

In some embodiments, the target task may involve querying a database, and thus a query pattern of the target task can be analyzed. Different subtasks may have the same or different query patterns, and thus at least one query pattern may be analyzed for the target task. The query pattern can include at least one of local filtering, index filtering, range query, multi-valued column query, and the like.

Then, an expected response time of a service level agreement (SLA) of each query pattern can be determined. A user can estimate and agree with the expected response time of the SLA by evaluating a plurality of factors. The factors can include at least one of an amount of data, a query pattern, a number of devices used, and the like. The SLA may not be an accurate value. For example, a value $RT\_a$ can be estimated according to a historical same-type query of the real-time computing system. Meanwhile, the user may obtain, according to a service system, an expected value $RT\_b$ that the user can accept, wherein $RT\_b \geq RT\_a$. $RT\_b$ can be used as a value of the SLA, and $RT\_a$ can be the response time of an expected response latency capability of a same-type query of the system. Therefore, expected response time of a service can be greater than the expected response latency capability of the same-type query of the system. If $RT\_b < RT\_a$, a current cluster resource allocation (e.g., the number of devices and the number of partitions) cannot meet a service requirement, and it is necessary to re-negotiate an SLA with the user to allocate more resources (e.g., the number of devices and the number of partitions) to reduce $RT\_a$ until $RT\_b \geq RT\_a$ is satisfied.

For example, for one terabyte (1 TB) data, a user loads the 1 TB data into 100 partitions by using 50 computing nodes. Each computing node can include two partitions. In some embodiments, an operation of "Hash Join" can be performed on two tables. When an overall data query filtering rate is 1/1000000 for the operation of "Hash Join," the response latency capability $RT\_a$ of the system can be 100 milliseconds, and the expected value $RT\_b$ that the service system of the user can accept is 200 milliseconds. In this case, $RT\_b > RT\_a$, and the SLA of the query service can be agreed upon as 200 milliseconds.

In step 104, system cost information and estimated response time can be estimated according to the query pattern and service description information, and node cost information of processing of each processing node in a system can be estimated. The service description information can include service-related statistical information. For example, the service description information can include: service data amount cardinality, frequency for a specific column value, histogram, and the like.

System cost information and estimated response time for executing a task can be estimated based on a query pattern and the service description information. After each subtask is distributed to a respective processing node in the system, node cost information of the processing node in processing the subtask can be further estimated. The cost information can include consumption information of resources required by a device in the system to process a task. For example, the cost information can include information regarding CPU consumption, JO consumption, network consumption, and the like.

In step 106, a processing node can be selected according to the node cost information, and a subtask in the target task can be allocated to the selected processing node.

After node cost information of each processing node for processing a subtask is determined, a processing node can be selected and allocated according to the node cost information. For example, a processing node having node cost information meeting a processing condition can be selected, and a subtask in the target task can be allocated to the selected processing node, and the processing node can be employed to process the subtask.

In step 108, an unallocated subtask in the target task can be determined, and the unallocated subtask can be scheduled according to the expected response time, the system cost information, and the estimated response time.

It can be difficult for the real-time computing system to process subtasks of the target task simultaneously. Therefore, the unallocated subtask in the target task can be determined according to allocated subtasks, then processing time of the remaining subtask can be computed according to the expected response time, the system cost information, and the estimated response time. The remaining subtask can be processed according to the processing time. For example, the unallocated subtask can be allocated to a processing node for processing after being delayed by a period of time.

When a real-time computing system is employed to process a target task, a query pattern and expected response time corresponding thereto can be determined. By using the expected response time as a reference, system cost information and estimated response time can be estimated according to the query pattern and service description information. And the node cost information of processing of each processing node in the system can also be estimated. A subtask in the target task can be allocated to a selected processing node. An unallocated subtask in the target task can be determined, and the remaining subtask can be scheduled according to the expected response time, the system cost information, and the estimated response time. Therefore, subtasks in the target task can be processed in batches within the expected response time, thereby reducing the system cost on the basis of satisfying the expected response time. The system response can be prevented from being prolonged or suspended due to cost and other problems, and the response time can be stabilized.

Embodiments of the application further discloses a method for task allocation of the real-time computing system.

Figure 2:
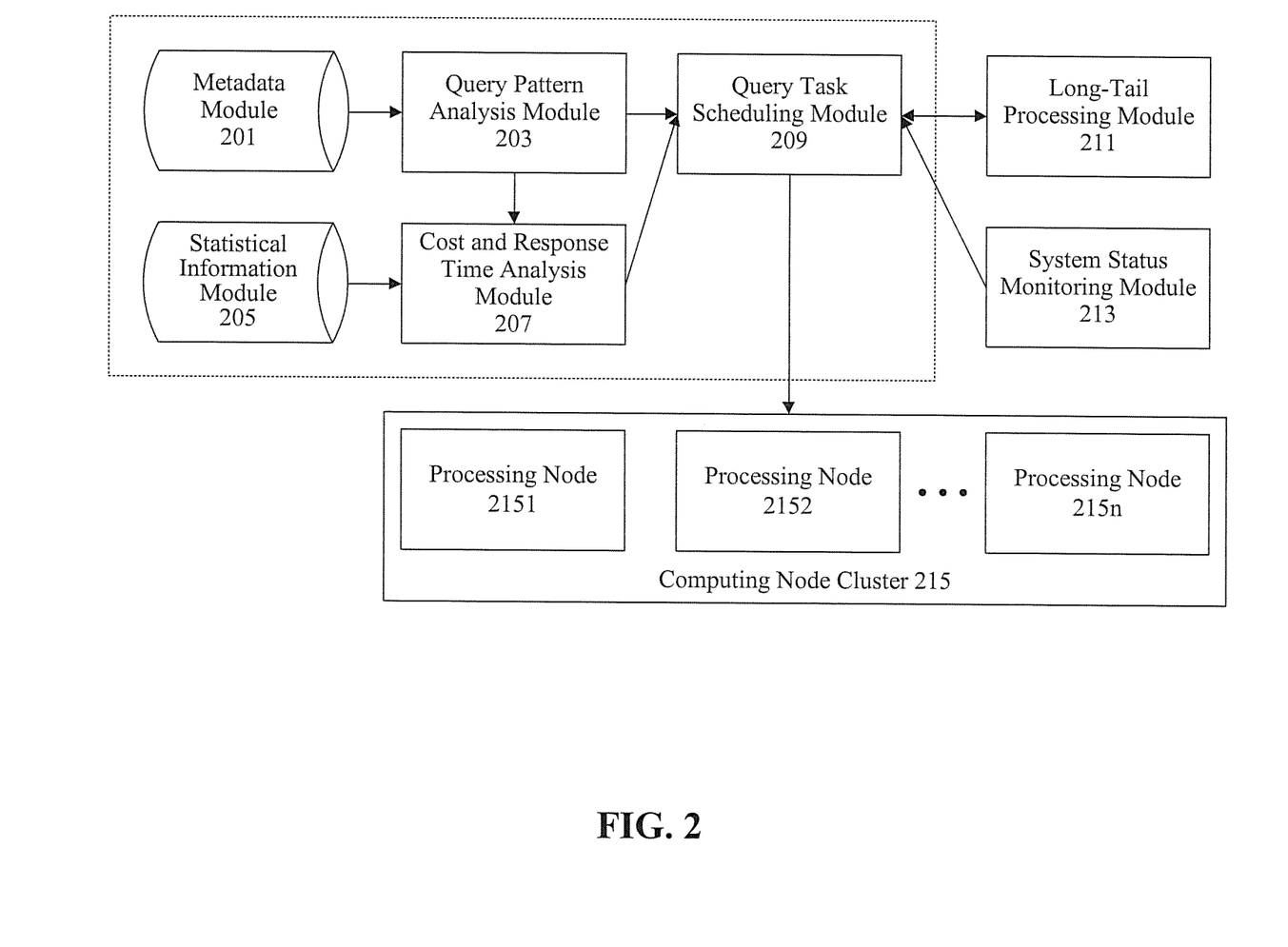
FIG. 2 is a structural block diagram of a real-time computing system according to embodiments of the present application.

FIG. 2 is a structural block diagram of a real-time computing system according to embodiments of the present application.

The real-time computing system can include: a metadata module 201, a query pattern analysis module 203), a statistical information module 205 (e.g.), a cost and response time analysis module 207), a query task scheduling module 209), a long-tail processing module 211), a system status monitoring module 213, and a computing node cluster 215. Metadata module 201 can be referred to as SLA Metadata, query pattern analysis module 203 can be referred to as Query Pattern Analyzer, statistical information module 205 can be referred to as Statistics, cost and response time analysis module 207 can be referred to as Cost and RT Analyzer, query task scheduling module 209 can be referred to as Query Task Scheduler, long-tail processing module 211 can be referred to as Tail Tolerance Scheduler, system status monitoring module 213 can be referred to as System Status Monitor, and computing node cluster 215 can be referred to as Computer Node Cluster. Furthermore, computing node cluster 215 can include a plurality of processing nodes 2151-215n.

Metadata module 201 can be configured to store a response time SLA of a query pattern in real-time data query amounts (workload) associated with all service. When a service system accesses the real-time computing system, expected response time of a query pattern in the event of a given data amount may be stored as SLA metadata. The SLA metadata can be provided to query pattern analysis module 203 to query for a matched expected response time (RT SLA) of a specific query.

Query pattern analysis module 203 can be configured to perform fast analysis on query patterns of a received query. The query patterns of the query can include local filtering, index filtering, hash joining, subquerying, range querying, multi-valued column querying, and the like. After the query pattern is determined, an RT SLA of a service for this query pattern can be read from the metadata module 201, as an input of query task scheduling module 209. The query pattern can also be used as an input of cost and response time analysis module 207, for estimation of cost and RT.

Statistical information module 205 can be configured to store service description information that describes data conditions of a service system. The service description information can include: data amount cardinality, frequency of a specific column value, histogram, and the like. The service description information may be updated regularly or in real time to reflect a current service data condition.

Cost and response time analysis module 207 can be configured to analyze cost information and estimate response time. The cost information can include: system cost information and node cost information. The Cost and RT Analyzer module reads statistical information to analyze costs, such as central processing unit (CPU) costs, input/output (JO) costs, network costs, and the like. Cost and response time analysis module 207 can reads statistical information to further perform RT estimation.

Query task scheduling module 209 can be configured to schedule a target task (e.g., making a decision of scheduling and distributing subtasks) In some embodiments, query task scheduling module 209 can read a query pattern, an estimated query cost and RT, and system running status information, and schedule the subtasks for a query. A computing task of a distributed real-time computing system generally consists of a great number of subtasks, and the subtasks can be performed in parallel. Therefore, query task scheduling module 209 may further coordinate with long-tail processing module 211 that has been implemented simultaneously, and perform long-tail processing.

Long-tail processing module 211 can be configured to perform long-tail processing on the subtasks in the system.

System status monitoring module 213 can be configured to collect system running statuses of processing nodes in real time.

Computing node cluster 215 can be configured to perform query processing on the subtasks. Computing node cluster 215 can include multiple processing/computing nodes 2151-215n. Computing node cluster 215 can be configured to receive a subtask request sent by a server, and return a computing result. The distributed computing mode cluster can include multiple servers, and the servers can be divided into multiple copies. Each copy can include complete data. Each copy can be further divided into multiple partitions. Each partition can include partial data, and queries for the partitions can be performed in parallel. One server (computing node) can store one or more partitions of data.

Based on the real-time computing system, subtasks can be properly scheduled on the basis of satisfying an agreed expected response time SLA to stabilize response time of the real-time computing system.

Figure 3:
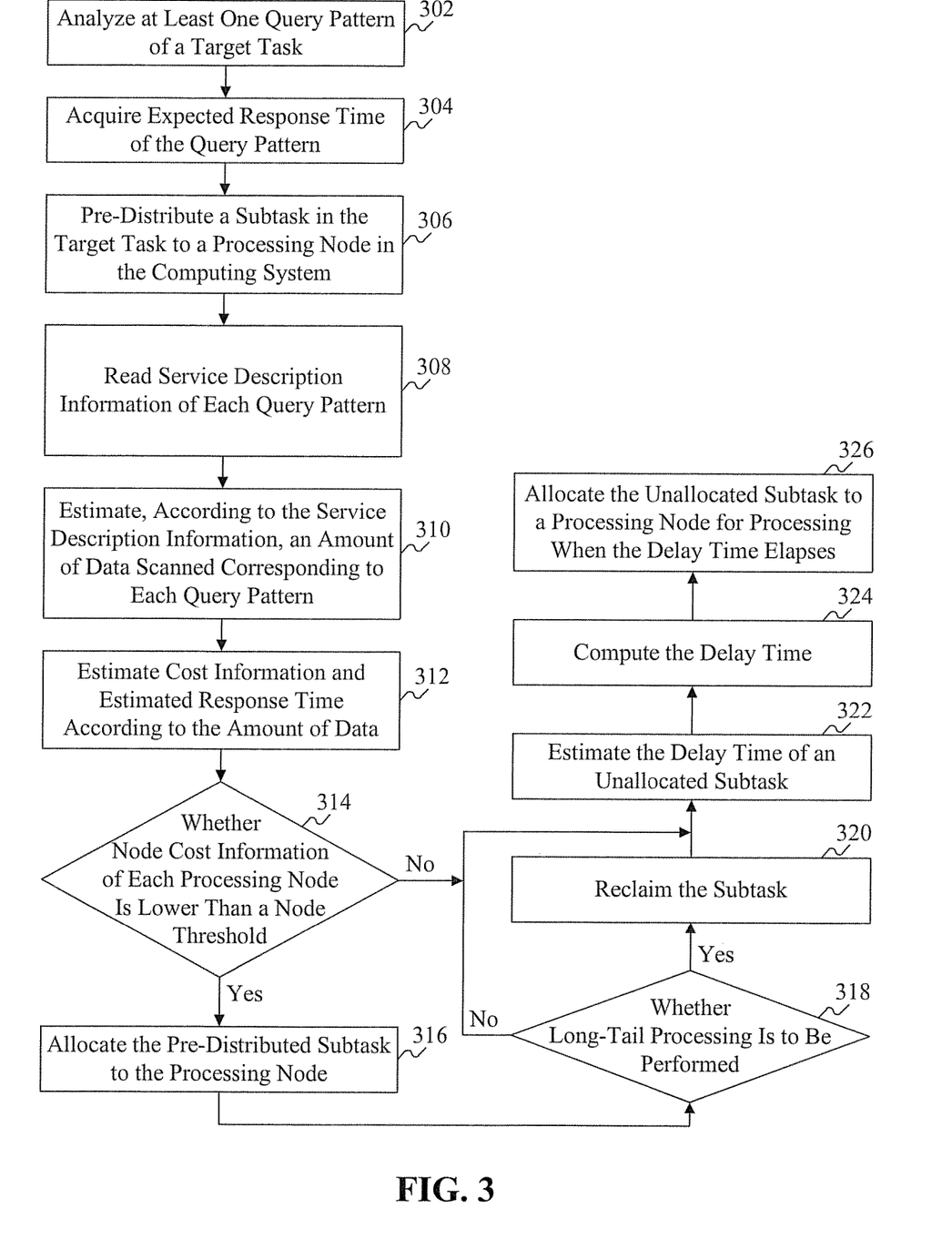
FIG. 3 is a flowchart of another exemplary task allocation method according to embodiments of the present application.

FIG. 3 illustrates a flowchart of another exemplary task allocation method according to embodiments of the present application. The task allocation method can include steps 302-326.

In step 302, at least one query pattern can be analyzed according to a target task. A database table can be queried according to the target task, and a query pattern of a corresponding column of each database table can be determined. For example, query statements for a user database "db1" can be listed as below:

SELECT tab1.col1, tab1.col2, tab2.col1, tab2.col2
FROM tab1 join tab2 on tab1.col3=tab2.col3
WHERE tab1.col1='value1'
   AND tab2.col2='value2'
   AND tab2.col4 IN ('value3', 'value4', 'value5', 'value6')
   AND tab2.col5>100000
   AND tab2.col6 IN (SELECT tab3.col1 FROM tab3 WHERE tab3.col2='value7')

After the database "db1" is queried based on the above statements, the following six query patterns may be obtained:

(1) local filtering is present in the column col1 of the table tab1;
(2) local filtering is present in the column col2 of the table tab2;
(3) multi-valued column query is present in the column col4 of the table tab2 (col4 is a multi-valued column);
(4) range query is present in the column col5 of the table tab2;
(5) subquery is present in the column col6 of the table tab2, wherein the subquery matches single table query; and
(6) local filtering is present in the column col2 of the table tab3.

Thus, a corresponding query pattern can be analyzed from a database table corresponding to a database according to a corresponding query statement.

In step 304, expected response time of the query pattern can be acquired. Then, total expected response time of the target task can be obtained by reading respective expected response time of each query pattern from SLA Metadata. As in the above example, by reading from the user's SLA Metadata, a response latency (RT) SLA of the above six query patterns that the database db1 includes is 400 milliseconds.

In step 306, subtasks in the target task can be pre-distributed to a respective processing node in the system. In some embodiments, a computing node can process too many tasks and affect task delay time. Therefore, before a subtask is formally allocated, the subtasks may be evaluated by respective processing nodes in the system. The evaluation of the subtasks can also be referred to as "pre-allocation" or "pre-distribution." The evaluation of the subtasks can determine contents, such as response time and consumption of each processing node for the subtasks, thereby determining whether the subtasks can be formally allocated.

In step 308, service description information of a database table corresponding to each query pattern can be read.

In step 310, an amount of data scanned corresponding to each query pattern can be estimated according to the service description information.

In step 312, cost information and estimated response time can be estimated according to the amount of data. The Cost and RT Analyzer reads, from Statistics, service description information of a database table corresponding to each query pattern. The service description information can include, for example, data amount cardinality, frequency of a specific column value, histogram, and the like. Then, the amount of data (e.g., the number of pieces of data) scanned corresponding to each query pattern can be estimated according to the service description information, and then cost information and an RT value can be estimated in combination with a CPU cost unit, an IO cost unit, and a network cost unit. The cost information can include system cost information and node cost information. Therefore, system cost information and an RT value of the system for processing the target task and node cost information and an RT value of each processing node for processing a subtask can be estimated through the above processes.

By taking estimation of system cost information as an example, query cost and RT estimation may be performed by using the following formula:

Query cost=CPU cost+IO cost+network cost.

In the example of the query patterns corresponding to the user's target task, computation of the following six specific query patterns can be included as below:

(1) local filtering is present in the column *col*1 of the table tab1 (='value1');
(2) local filtering is present in the column col2 of the table tab2 (='value2');
(3) multi-valued column query is present in the column col4 of the table tab2 (col4 is a multi-valued column) (four values);
(4) range query is present in the column col5 of the table tab2 (>100000);
(5) subquery is present in the column col6 of the table tab2, wherein the subquery is matched with single table query (e.g., the query in tab3 below); and
(6) local filtering is present in the column col2 of the table tab3 (='value7').

Service description information of a database table corresponding to each query pattern can be read from the statistical information module (e.g., Statistics). It is assumed that service description information for the query patterns can be as follows.

The cardinality of the column col1 of the table tab 1 is 5; the frequency of the value "value1" of the column coil of the table tab1 is 10/100000000; the cardinality of the column col2 of the table tab2 is 8; the frequency of the value "value2" of the column col2 of the table tab2 is 1/100000000; the cardinality of the column col4 (multi-valued column) of the table tab2 is 1000000; the cardinality of the column col5 of the table tab2 is 10000; values of the column col5 of the table tab2 that are greater than 100000 account for 20% of the total number of records; the cardinality of the column col2 of the table tab3 is 10; and the frequency of the value "value7" of the column col2 of the table tab3 is 1/1000.

According to the above service description information, the number of pieces of data to be scanned can be estimated based on the query patterns (e.g., patterns (1)-(6)) and total costs. Therefore, system cost information and an RT value can be obtained in combination with CPU, I/O, and network cost units.

In step 314, it is determined whether node cost information of each processing node is lower than a node threshold respectively. The query task scheduling module can read the query pattern and the estimated cost information and RT value, and read system running status information from the System Status Monitor to perform subtask scheduling.

A node threshold can be configured in the system. The node threshold is used to measure a task processing capability of a processing node. Therefore, it can be determined whether the node cost information of each processing node is lower than the node threshold respectively, thereby determining whether a subtask can be allocated to the processing node.

If the node cost information of the processing node is lower than the node threshold, step 316 can be performed. If the node cost info illation of the processing node is not lower than the node threshold, step 322 can be performed.

In step 316, a pre-distributed subtask can be allocated to the processing node. The node cost information of the processing node being lower than the node threshold represents that the processing node has a capability of processing the subtask in real time, and a pre-distributed subtask can be allocated to the processing node. It is possible that another subtask may also be allocated to the processing node for processing.

In step 318, it is determined whether long-tail processing is to be performed. After the subtask is allocated to the processing node for processing, the processing node can complete processing on the task within a specified time (for example, within an expected response time). The expected response time may be the time for the subtask, and may also be the total time of all subtasks distributed simultaneously. If processing on the subtask cannot be completed within the specified time, long-tail processing may be triggered. The long-tail processing can be, for example, distributing a subtask once again for re-processing.

If long-tail processing is performed, step 320 can be performed. If long-tail processing is not performed, step 322 can be performed.

In step 320, the subtask can be reclaimed. After the total processing time elapses, if processing on an allocated subtask is not completed, long-tail processing may be performed. In other words, the subtask is reclaimed and distributed once again for processing.

If long-tail processing is performed, the reclaimed subtask can be added as a remaining subtask. In some embodiments, as discussed in step 108, the unallocated subtasks can be scheduled according to the expected response time, the system cost information, and the estimated response time. The scheduling of the unallocated subtasks can include: conducting statistics on total processing time corresponding to allocated subtasks; estimating delay time of the unallocated subtasks according to the expected response time, the system cost information, the estimated response time, and the total processing time; and allocating the unallocated subtasks to processing nodes after the unallocated subtask is delayed according to the delay time.

In step 322, delay time of the unallocated subtask can be estimated.

In step 324, the delay time can be computed.

In step 326, the unallocated subtask can be allocated to a processing node for processing when the delay time elapses.

In some embodiments of the present application, the estimation of the delay time of the unallocated subtasks can include: estimating processing time of the remaining subtask according to the estimated response time and the system cost information; and estimating the delay time of the remaining subtask according to the expected response time and the processing time of the remaining subtask.

In some embodiments of the present application, the allocation of the unallocated subtask to a processing node after the unallocated subtask is delayed according to the delay time can include: counting the delay time after processing on the allocated subtasks is completed; and allocating the unallocated subtasks to the processing nodes for processing when the delay time elapses.

The unallocated subtasks may be delayed. In some embodiments, statistics on total processing time corresponding to allocated subtasks may be conducted at first. For example, the total processing time can be estimated according to expected response time of each subtask. Then, delay time of the unallocated subtasks can be estimated according to the expected response time, the system cost information, the estimated response time, and the total processing time. Therefore, the processing time of the unallocated subtasks can be estimated according to the estimated response time and the system cost information, and then delay time of the unallocated subtask can be estimated according to total expected response time of the target task, the processing time of the remaining subtask, and the total processing time corresponding to the allocated subtasks.

After processing on the allocated subtasks is completed or the total processing time elapses, counting of the delay time can start. For example, a timer is started for timing, and the unallocated subtask can be allocated to a processing node for processing after the delay time elapses. For example, the unallocated subtask may be allocated to a pre-distributed processing node for processing, or to other relatively idle processing nodes for processing.

For example, the agreed SLA corresponding to the query pattern in the above example can be 200 milliseconds, and there is a total of 100 subtasks in the target task. After estimating cost, it is determined that node cost information of 60 processing nodes is lower than a node threshold, thus 60 subtasks can be distributed to corresponding computing nodes and total processing time can be determined as 50 milliseconds. Then, system running statuses, data amounts and task costs of the computing nodes where the allocated 60 subtasks are located can be estimated and compared with system running statuses, data amounts and task costs of target nodes of the unallocated 40 subtasks. For example, it is estimated that processing time of the 40 subtasks is 100 milliseconds. Consumption of the processing time may be estimated by using a linear relationship.

The remaining subtask can be delayed, and distribution delay time of the remaining 40 subtasks is computed. For example, the distributed delay time can be computed as follows:

$$\text{distribution delay time} = 200 - 50 - 100 - T\_schedule\_cost.$$

It is assumed that $T\_schedule\_cost$ can be a computing cost required by a decision-making and scheduling algorithm when the algorithm is conducted. $T\_schedule\_cost$ can be an empirical value determined based on historical empirical statistics. The value of $T\_schedule\_cost$ can be small. For example, if $T\_schedule\_cost$ is 1 milliseconds, the distribution delay can be 49 milliseconds.

With respect to the distribution delay, counting of the delay time may start after the 60 subtasks are completed or the subtasks are reclaimed by the long-tail process. Unallocated subtasks can be distributed after waiting 49 milliseconds. From the perspective of the computing node cluster, the delay time of, for example, 49 milliseconds can effectively balance and mitigate resource utilization of the real-time computing system.

Figure 4:
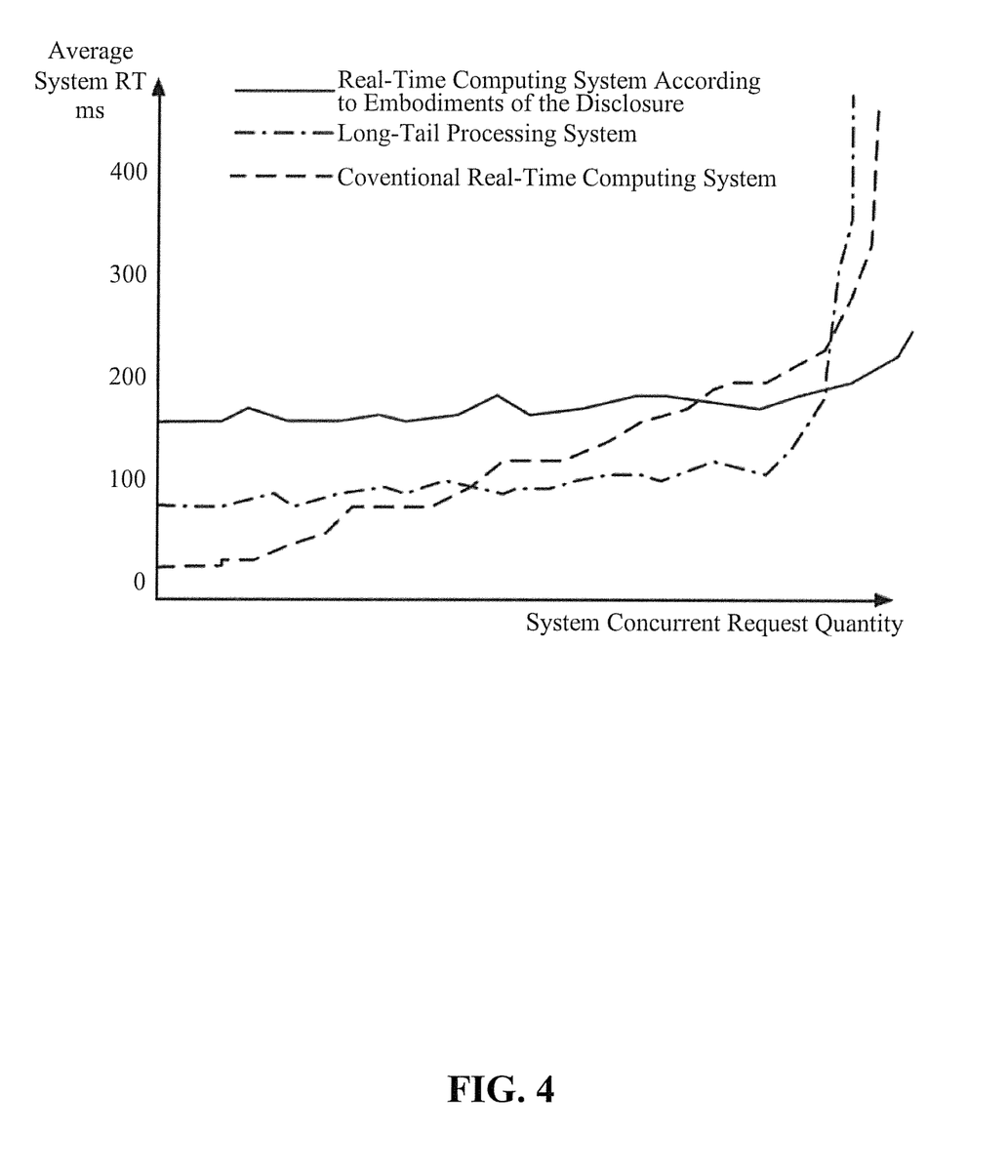
FIG. 4 is a schematic diagram of comparison between response time of different cluster systems according to embodiments of the present application.

FIG. 4 is a schematic diagram of comparison between response time of different cluster systems according to embodiments of the present application. As shown in FIG. 4, response time of a real-time computing system according to embodiments of the disclosure is illustrated and compared with a conventional real-time computing system and a long-tail processing system.

In FIG. 4, the dashed line "--" is used to represent the conventional real-time computing system. With the increase of concurrent access to the system, average RT gradually rises. Upon arrival at the system bottleneck, the RT significantly increases. Finally, the system is suspended.

The dot dash line "-•-" is used to represent the long-tail processing system. Average response RT of the system within a bottleneck threshold of concurrent access is relatively stable, but the bottleneck threshold of the system is not increased, and the system can reach the bottleneck threshold earlier due to a retransmission policy.

The straight line "-" is used to represent the real-time computing system in according to the disclosed embodiments. Although average RT of the system is relatively high, the overall system resource utilization is relatively stable within an SLA range required by service responses. And with the increase of access, the influence on the system RT is little, and the bottleneck threshold of the system is increased.

Therefore, embodiments of the present application provide a new service access SLA pattern technology, which can stabilize a response latency for computing requests in real time and increase the bottleneck threshold of the system while satisfying a real-time computing response SLA of a service. Two steps are mainly included: 1) estimating query cost information and a response latency based on a query pattern and service description information; and 2) scheduling a computing task online based on a service SLA.

For different query patterns, fast pattern matching and analysis can be performed on queries by using the amount of data and service description information, response time consumption of similar historical query patterns, and the like. Rough cost information (e.g., a CPU cost, an Input/Output (I/O) cost, and the like) and a response latency can be estimated to facilitate subsequence related decisions of online computing and scheduling.

A real-time query and computing service can be different from an offline data warehouse. In the offline data warehouse, query patterns included in query workload thereof can be known in advance, and a response latency is required to be within milliseconds (a few milliseconds or hundreds of milliseconds), or tens of seconds. In the above estimation process of the real-time query and computing service, responses and costs of these queries may be estimated relatively accurately, so that a response latency SLA of a different query pattern can be agreed upon with the user (a same-type query generally has the longest response latency in the event of resource configuration that the user applies for). Then the system performs flexible online computing task scheduling based on the SLA, and can further use the long-tail processing technology to optimize the resource utilization and increase the system bottleneck threshold to achieve the objective of stabilizing the response latency.

It should be noted that, for ease of description, the above embodiments are all described as combinations of a series of actions. However, it is appreciated that embodiments of the present application are not limited to the described sequence of the actions, because some steps may be performed in another sequence or simultaneously according to embodiments of the present application. In addition, it is also appreciated that embodiments described in this specification all belong to preferred embodiments, and the involved actions are not necessarily mandatory to embodiments of the present application.

Embodiments of the disclosure further provides a task allocation (also be referred to as scheduling) system.

Figure 5:
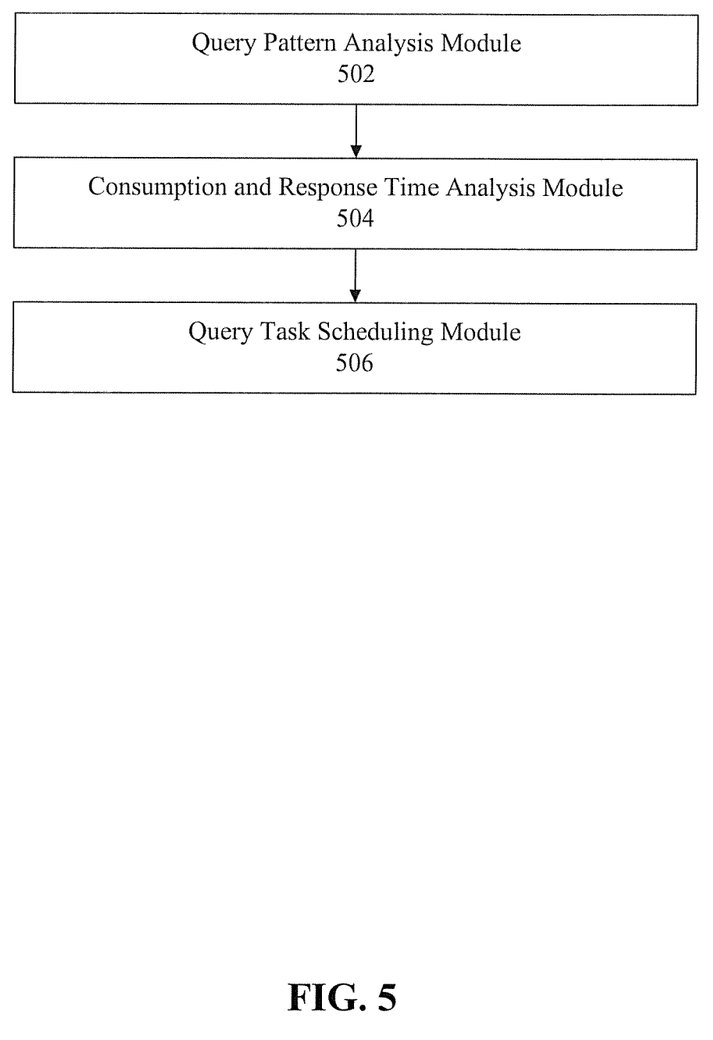
FIG. 5 is a structural block diagram of an exemplary task allocation system according to embodiments of the present application.

FIG. 5 illustrates a structural block diagram of a task allocation system according to embodiments of the present application. The task allocation system may include a query pattern analysis module 502, a consumption and response time analysis module 504, and a query task scheduling module 506.

Query pattern analysis module 502 can be configured to analyze at least one query pattern according to a target task to acquire expected response time of the query pattern;

Consumption and response time analysis module 504 can be configured to estimate system cost information and estimated response time according to the query pattern and service description information, and estimate node cost information of processing of each processing node in a computing system.

Query task scheduling module 506 can be configured to select a processing node according to the node cost information, and allocate a subtask in the target task to the selected processing node; and determine a remaining subtask unallocated in the target task, and schedule the remaining subtask according to the expected response time, the system cost information, and the estimated response time.

In some embodiments, the task allocation (scheduling) system may be a subsystem of a real-time computing system. Query pattern analysis module 502 can acquire expected response time of a query pattern from a metadata module. Connection relationships between the modules in the task scheduling system and other modules in the real-time computing system are as those in FIG. 2 and the corresponding embodiments, and thus are not further described.

When a real-time computing system is employed to process a target task, a query pattern and expected response time corresponding thereto can be determined. By using the expected response time as a reference, system cost information and estimated response time are estimated according to the query pattern and service description information, and node cost information of processing of each processing node in the system is estimated. A subtask in the target task is allocated to a selected processing node. An unallocated subtask in the target task is determined, and the unallocated subtask is scheduled according to the expected response time, the system cost information, and the estimated response time. In this way, subtasks in the target task are processed in batches within the expected response time, thereby reducing the system cost on the basis of satisfying the expected response time, preventing the response time from being prolonged or the system from getting stuck due to cost and other problems, and stabilizing the response time.

Figure 6:
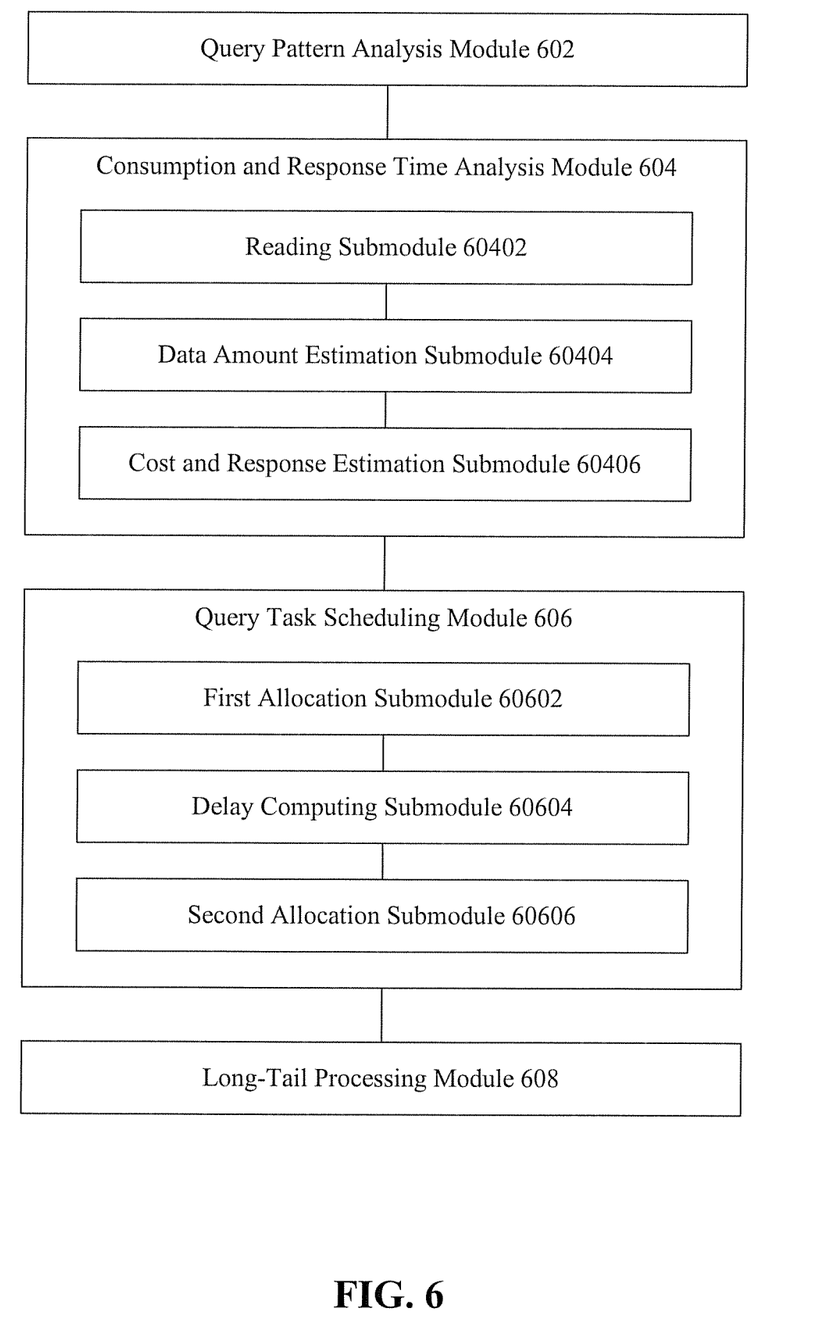
FIG. 6 is a structural block diagram of another exemplary task allocation system according to embodiments of the present application.

FIG. 6 illustrates a structural block diagram of another task allocation system according to embodiments of the present application. The task allocation system of FIG. 6 may include a query pattern analysis module 602, a consumption and response time analysis module 604, a query task scheduling module 606, and a long-tail processing module 608.

Query pattern analysis module 602 can be configured to analyze at least one query pattern according to a target task to acquire expected response time of the query pattern;

Consumption and response time analysis module 604 can be configured to estimate system cost information and estimated response time according to the query pattern and service description information, and estimate node cost information of processing of each processing node in a system.

Query task scheduling module 606 can be configured to select a processing node according to the node cost information, and allocate a subtask in the target task to the selected processing node, determine a remaining subtask unallocated in the target task, and schedule the remaining subtask according to the expected response time, the system cost information, and the estimated response time.

Long-tail processing module 608 can be configured to, in response to the allocated subtask being uncompleted after total processing time elapses, to reclaim the uncompleted allocated subtask. Query task scheduling module 606 can be further configured to schedule the reclaimed subtask as an unallocated subtask.

Consumption and response time analysis module 604 can further include: a reading submodule 60402, a data amount estimation submodule 60404, and a cost and response estimation submodule 60406.

Reading submodule 60402 can be configured to read service description information of a database table corresponding to each query pattern, wherein the service description information is used to describe service data of the system.

Data amount estimation submodule 60404 can be configured to estimate, according to the service description information, an amount of data scanned corresponding to each query pattern.

Cost and response estimation submodule 60406 can be configured to estimate the system cost information and the estimated response time according to the amount of data, wherein the system cost information includes at least one of the following: processor cost information, input/output cost information, and network cost information.

Query task scheduling module 606 can be further configured to pre-distribute a subtask in the target task to a respective processing node in the system.

Consumption and response time analysis module 604 can be further configured to determine service description information for each processing node according to a database table corresponding to a query pattern of the subtask, and estimate, according to the service description information, node cost information of the processing node for processing the subtask.

Query task scheduling module 606 can include: a first allocation submodule 60602, a delay computing submodule 60604, and a second allocation submodule 60606.

First allocation submodule 60602 can be configured to determine whether node cost information of each processing node is lower than a node threshold respectively, and allocate the pre-distributed subtask to the processing node when the node cost information of the processing node is lower than the node threshold.

Delay computing submodule 60604 can be configured to conduct statistics on total processing time corresponding to allocated subtasks; and estimate delay time of the remaining subtask according to the expected response time, the system cost information, the estimated response time, and the total processing time.

Second allocation submodule 60606 can be configured to allocate the remaining subtask to a processing node after the remaining subtask is delayed according to the delay time.

Delay computing submodule 60604 can be configured to estimate processing time of the remaining subtask according to the estimated response time and the system cost information; and estimate the delay time of the remaining subtask according to the expected response time and the processing time of the remaining subtask.

Second allocation submodule 60606 can be configured to start to count the delay time after processing on the allocated subtasks is completed; and allocate the remaining subtask to the processing node for processing when the delay time elapses.

Embodiments of the present application provide a new service access SLA pattern technology, which can stabilize a response latency for computing requests in real time and increase the bottleneck threshold of the system while satisfying a real-time computing response SLA of a service. Two steps are mainly included: 1) estimating query cost information and a response latency based on a query pattern and service description information; and 2) scheduling a computing task online based on a service SLA.

For different query patterns, fast pattern matching and analysis can be performed on queries by using the amount of data and service description information, response time consumption of similar historical query patterns, and the like, and substantial cost information (e.g., a CPU cost, an I/O cost, and the like). A response latency can be estimated to facilitate subsequence related decisions of online computing and scheduling.

A real-time query and computing service is different from an offline data warehouse. In the offline data warehouse, query patterns included in query workload thereof can be known in advance, and a response latency is required to be within milliseconds (a few milliseconds or hundreds of milliseconds), or tens of seconds. In the above estimation process of the real-time query and computing service, responses and costs of these queries may be estimated relatively accurately, so that a response latency SLA of a different query pattern can be agreed upon with the user (a same-type query generally has the longest response latency in the event of resource configuration that the user applies for). Then the system performs flexible online computing task scheduling based on SLA and can further use the long-tail processing technology to optimize the resource utilization and increase the system bottleneck threshold to achieve the objective of stabilizing the response latency.

For the apparatus embodiments, as they are basically similar to the foregoing method embodiments, the description thereof is relatively simple. Reference can be made to the description of the part of the method embodiments for related contents.

Embodiments in this specification are all described in a progressive manner, each embodiment emphasizes a difference from other embodiments, and identical or similar parts in embodiments may be obtained with reference to each other.

Those skilled in the art should understand that embodiments of the present application may be provided as a method, an apparatus, or a computer program product. Therefore, embodiments of the present application may be implemented as a complete hardware embodiment, a complete software embodiment, or an embodiment combining software and hardware. Moreover, embodiments of the present application may be in the form of a computer program product implemented on one or more computer usable storage media (including, but not limited to, a magnetic disk memory, a CD-ROM, an optical memory, and the like) including computer usable program codes.

In some embodiments, the computer device includes one or more processors (CPUs), an input/output interface, a network interface, and a memory. The memory may include a volatile memory, a random access memory (RAM) and/or a non-volatile memory or the like in a computer readable medium, for example, a read only memory (ROM) or a flash RAM. The memory is an example of the computer readable medium. The computer readable medium includes non-volatile and volatile media as well as movable and non-movable media, and can implement information storage by means of any method or technology. Information may be a computer readable instruction, a data structure, and a module of a program or other data. An example of the storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition herein, the computer readable medium does not include transitory media, such as modulated data signals and carriers.

Embodiments of the present application are described with reference to flowcharts and/or block diagrams of the method, terminal device (system) and computer program product according to embodiments of the present application. It should be understood that a computer program instructions may be used to implement each process and/or block in the flowcharts and/or block diagrams and combinations of processes and/or blocks in the flowcharts and/or block diagrams. The computer program instructions may be provided to a computer, an embedded processor or a processor of another programmable data processing terminal device to generate a machine, such that the computer or the processor of another programmable data processing terminal device executes an instruction to generate an apparatus configured to implement functions designated in one or more processes in a flowchart and/or one or more blocks in a block diagram.

The computer program instructions may also be stored in a computer readable storage that can guide the computer or another programmable data processing terminal device to work in a specific manner, such that the instructions stored in the computer readable storage generates an article of manufacture including an instruction apparatus, and the instruction apparatus implements functions designated in one or more processes in a flowchart and/or one or more blocks in a block diagram.

The computer program instructions may also be installed in the computer or another programmable data processing terminal device, such that a series of operation steps are executed on the computer or another programmable terminal device to generate a computer implemented processing, and therefore, the instruction executed in the computer or another programmable terminal device provides steps for implementing functions designated in one or more processes in a flowchart and/or one or more blocks in a block diagram.

Preferred embodiments of embodiments of the present invention have been described; however, once knowing the basic creative concepts, those skilled in the art can make other variations and modifications to embodiments. Therefore, the appended claims are intended to be explained as including the preferred embodiments and all variations and modifications falling within the scope of embodiments of the present application.

Finally, it should be further noted that the relation terms such as first and second herein are merely used to distinguish one entity or operation from another entity or operation, and do not necessarily require or imply such an actual relation or sequence between the entities or operations. Moreover, the terms "include", "comprise" or other variations thereof are intended to cover non-exclusive inclusion, so that a process, method, article or terminal device including a series of elements not only includes the elements, but also includes other elements not clearly listed, or further includes inherent elements of the process, method, article or terminal device. In the absence of more limitations, an element defined by "including a/an . . . " does not exclude that the process, method, article or terminal device including the element further has other identical elements.

A task allocation (scheduling) method and a task allocation (scheduling) system provided in the present application are described in detail above, and the principles and implementation manners of the present application are described by using specific examples herein. The above descriptions about embodiments are merely used to help understand the method of the present application and core ideas thereof. Meanwhile, for those of ordinary skill in the art, there may be modifications to the specific implementation manners and application scopes according to the idea of the present application. Therefore, the content of the specification should not be construed as a limitation to the present application.

What is claimed is:

1. A task allocation method of a computing system, comprising:
    analyzing one or more query patterns of a target task to acquire expected response time of one or more query patterns;
    estimating system cost information and estimated response time according to the one or more query patterns and service description information;
    estimating node cost information of each processing node of a set of processing nodes in the computing system;
    selecting a processing node of the set of processing nodes according to the node cost information to allocate subtasks of the target task to the selected processing node; and
    scheduling a determined unallocated subtask of the target task according to the expected response time, the system cost information, and the estimated response time.

2. The method according to claim 1, wherein estimating the system cost information and the estimated response time according to the one or more query patterns and service description information further comprises:
    reading service description information of each of the one or more query patterns, wherein the service description information is associated with service data of the computing system;
    estimating, according to the service description information, an amount of data scanned corresponding to each of the one or more query patterns; and
    estimating the system cost information and the estimated response time according to the amount of data, wherein the system cost information comprises at least one of processor cost information, input/output cost information, and network cost information.

3. The method according to claim 1, before estimating the node cost information of processing of each processing node of the set of processing nodes in the computing system, further comprising:
    pre-distributing a subtask of the target task to a respective processing node in the system.

4. The method according to claim 3, wherein estimating node cost information of processing of each processing node of the set of processing nodes in the computing system further comprises:
    determining service description information for each processing node of the set of processing nodes according to a database table corresponding to a query pattern of the subtask; and
    estimating, according to the service description information, the node cost information of the processing node for processing the subtask.

5. The method according to claim 3, wherein selecting the processing node of the set of processing nodes according to the node cost information to allocate the subtasks of the target task to the selected processing node comprises:
    determining whether the node cost information of each processing node of the set of processing nodes is lower than a node threshold respectively; and
    allocating the pre-distributed subtask to the selected processing node when the node cost information of the selected processing node is lower than the node threshold.

6. The method according to claim 1, wherein scheduling the unallocated subtask according to the expected response time, the system cost information, and the estimated response time comprises:
    conducting statistics on total processing time of allocated subtasks;
    estimating delay time of the unallocated subtask according to the expected response time, the system cost information, the estimated response time, and the total processing time; and
    allocating the unallocated subtask to a processing node after the unallocated subtask is delayed by the delay time.

7. The method according to claim 6, wherein estimating the delay time of the unallocated subtask according to the expected response time, the system cost information, the estimated response time, and the total processing time further comprises:
estimating processing time of the unallocated subtask according to the estimated response time and the system cost information; and
estimating the delay time of the unallocated subtask according to the expected response time and the processing time of the remaining subtask.

8. The method according to claim 6, wherein allocating the unallocated subtask to the processing node after the unallocated subtask is delayed by the delay time comprises:
counting the delay time after processing on the allocated subtasks is completed; and
allocating the unallocated subtask to the processing node when the delay time elapses.

9. The method according to claim 1, further comprising:
in response to an allocated subtask being uncompleted after the total processing time elapses, reclaiming the allocated subtask; and scheduling the reclaimed subtask as an unallocated subtask.

10. A task allocation system, comprising:
a memory storing a set of instructions; and
one or more processors configured to execute the set of instructions to cause the system to perform:
analyzing one or more query patterns of a target task to acquire expected response time of the one or more query patterns;
estimating system cost information and estimated response time according to the one or more query patterns and service description information; and
estimating node cost information of each processing node of a set of processing nodes in a computing system; and
selecting a processing node of the set of processing nodes according to the node cost information to allocate subtasks of the target task to the selected processing node; and
determining an unallocated subtask in of the target task to schedule the unallocated subtask according to the expected response time, the system cost information, and the estimated response time.

11. A non-transitory computer readable medium that stores a set of instructions that is executable by at least one processor of a computing system to cause the computing system to perform a task allocation method, the method comprising:
analyzing one or more query patterns of a target task to acquire expected response time of the one or more query patterns;
estimating system cost information and estimated response time according to the one or more query patterns and service description information; and
estimating node cost information of each processing node of a set of processing nodes in the computing system;
selecting a processing node of the set of processing nodes according to the node cost information to allocate subtasks of the target task to the selected processing node; and
determining an unallocated subtask of the target task to schedule the unallocated subtask according to the expected response time, the system cost information, and the estimated response time.

12. The non-transitory computer readable medium according to claim 11, wherein estimating the system cost information and the estimated response time according to the one or more query patterns and service description information includes:
reading service description information of each of the one or more query patterns, wherein the service description information is associated with service data of the computing system;
estimating, according to the service description information, an amount of data scanned corresponding to each of the one or more query patterns; and
estimating the system cost information and the estimated response time according to the amount of data, wherein the system cost information comprises at least one of processor cost information, input/output cost information, and network cost information.

13. The non-transitory computer readable medium according to claim 11, wherein before estimating the node cost information of processing of each processing node of the set of processing nodes in the computing system, the set of instructions is executable by at least one processor of a computing system to cause the computing system to further perform:
pre-distributing a subtask of the target task to a respective processing node in the system.

14. The non-transitory computer readable medium according to claim 13, wherein estimating node cost information of processing of each processing node of the set of processing nodes in the computing system includes:
determining service description information for each processing node according to a database table corresponding to a query pattern of the subtask; and
estimating, according to the service description information, the node cost information of the processing node for processing the subtask.

15. The non-transitory computer readable medium according to claim 14, wherein selecting the processing node of the set of processing nodes according to the node cost information to allocate the subtasks of the target task to the selected processing node includes:
determining whether the node cost information of each processing node of the set of processing nodes is lower than a node threshold respectively; and
allocating the pre-distributed subtask to the selected processing node when the node cost information of the selected processing node is lower than the node threshold.

16. The non-transitory computer readable medium according to claim 11, wherein scheduling the unallocated subtask according to the expected response time, the system cost information, and the estimated response time includes:
conducting statistics on total processing time of allocated subtasks;
estimating delay time of the unallocated subtask according to the expected response time, the system cost information, the estimated response time, and the total processing time; and
allocating the unallocated subtask to a processing node after the unallocated subtask is delayed by the delay time.

17. The non-transitory computer readable medium according to claim 16, wherein estimating the delay time of the unallocated subtask according to the expected response time, the system cost information, the estimated response time, and the total processing time includes:
estimating processing time of the unallocated subtask according to the estimated response time and the system cost information; and estimating the delay time of the unallocated subtask according to the expected response time and the processing time of the remaining subtask.

18. The non-transitory computer readable medium according to claim 16, wherein allocating the unallocated subtask to the processing node after the unallocated subtask is delayed by the delay time includes:
    counting the delay time after processing on the allocated subtasks is completed; and
    allocating the unallocated subtask to the processing node when the delay time elapses.

19. The non-transitory computer readable medium according to claim 11, wherein the set of instructions is executable by at least one processor of a computing system to cause the computing system to further perform:
    in response to an allocated subtask being uncompleted after the total processing time elapses, reclaiming the allocated subtask; and
    scheduling the reclaimed subtask as an unallocated subtask.

\* \* \* \* \*